(12) United States Patent
Kim et al.

(10) Patent No.: US 12,345,842 B2
(45) Date of Patent: Jul. 1, 2025

(54) SYSTEM AND METHOD FOR MONITORING GAMMA-RAY SPECTROSCOPY DATA FROM SATELLITES

(71) Applicant: Korea Institute Of Geoscience And Mineral Resources, Daejeon (KR)

(72) Inventors: Kyeong Ja Kim, Daejeon (KR); Suyeon Kim, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 0 days.

(21) Appl. No.: 18/805,656

(22) Filed: Aug. 15, 2024

(65) Prior Publication Data

US 2025/0060493 A1    Feb. 20, 2025

(30) Foreign Application Priority Data

Aug. 17, 2023    (KR) .................. 10-2023-0107348

(51) Int. Cl.
| | | |
|---|---|---|
| *G01T 1/36* | (2006.01) | |
| *G01T 1/169* | (2006.01) | |
| *G01T 7/00* | (2006.01) | |
| *B64G 1/10* | (2006.01) | |

(52) U.S. Cl.
CPC ............... *G01T 1/36* (2013.01); *G01T 1/169* (2013.01); *G01T 7/005* (2013.01); *B64G 1/1064* (2023.08)

(58) Field of Classification Search
CPC ............ G01T 1/36; G01T 1/169; G01T 7/005
See application file for complete search history.

(56) References Cited

U.S. PATENT DOCUMENTS

| | | |
|---|---|---|
| 10,746,597 B2 | 8/2020 | Lee et al. |
| 11,002,599 B2 | 5/2021 | Lee et al. |
| 11,520,067 B2 | 12/2022 | Price |
| 12,038,551 B2 | 7/2024 | Mamtimin |
| 2006/0262008 A1* | 11/2006 | Sanyal ............ G01S 13/86 342/120 |
| 2017/0030772 A1 | 2/2017 | Lee et al. |
| 2017/0219721 A1* | 8/2017 | Stassun ............ G01T 1/36 |
| 2020/0309972 A1 | 10/2020 | Price |
| 2020/0333183 A1 | 10/2020 | Lee et al. |

(Continued)

FOREIGN PATENT DOCUMENTS

| | | |
|---|---|---|
| KR | 20100060704 A | 6/2010 |
| KR | 20160141593 A | 12/2016 |

(Continued)

*Primary Examiner* — Hugh Maupin
(74) *Attorney, Agent, or Firm* — Harness, Dickey & Pierce, P.L.C.

(57) ABSTRACT

In order to collect and analyze data from the gamma-ray spectrometer of a lunar exporation satellite in real time, the present disclosure provides a system for monitoring gamma-ray spectrometer data from a satellite, comprising: a data collection unit configured to collect a raw data including a gamma-ray data from a planetary exploration satellite having a gamma-ray spectrometer; an environment setting unit configured to set and input a time range for monitoring and a display environment; a data processing unit configurd to store a filing data in which the raw data collected based on the inputted time range is classified and processed by time and by item; and a visualization unit configured to visualize the stored filing data as a graphic data.

12 Claims, 13 Drawing Sheets

(56) References Cited

U.S. PATENT DOCUMENTS

| | | | |
|---|---|---|---|
| 2022/0268953 A1* | 8/2022 | Behar | G01T 1/2907 |
| 2022/0317330 A1 | 10/2022 | Mamtimin | |
| 2025/0037459 A1* | 1/2025 | Majumdar | G06V 10/95 |

FOREIGN PATENT DOCUMENTS

| KR | 20170014622 A | 2/2017 |
|---|---|---|
| KR | 101824629 B1 | 2/2018 |
| KR | 20180070944 A | 6/2018 |
| KR | 102249120 B1 | 5/2021 |
| KR | 102539003 B1 | 6/2023 |

* cited by examiner

| Time | Location |

Input Data Path: Z:/Nucare Calibration/KPLOData/Count Spectrum Data
Output Data Path: Z:/KGRS Mapping
Deg: 05

Creating Folder — Create a folder in the output data path.

Classification — Categorize and store the files in the input datapath in the output datapath.

Summing — Summarizes the categorized files in the output datapath by folder.

Summed Data List | Raw Data List | 2022-08-09

Click on the file name below to display the graph | log

[230506] Summed_Data_230506_000007~230506_235957.csv
[230505] Summed_Data_230505_000006~230505_235957.csv
[230504] Summed_Data_230504_000006~230504_235956.csv
[230503] Summed_Data_230503_000006~230503_235956.csv
[230502] Summed_Data_230502_000005~230502_235956.csv
[230501] Summed_Data_230501_000005~230501_235955.csv
[230430] Summed_Data_230430_000004~230430_235955.csv
[230429] Summed_Data_230429_000004~230429_235954.csv
[230428] Summed_Data_230428_000004~230428_235954.csv
[230427] Summed_Data_230427_000003~230427_235954.csv
[230426] Summed_Data_230426_000003~230426_235953.csv FIG. 6
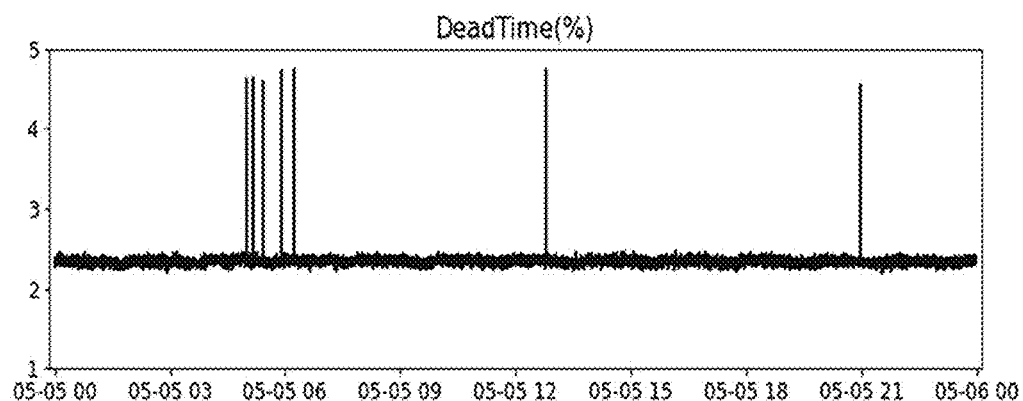
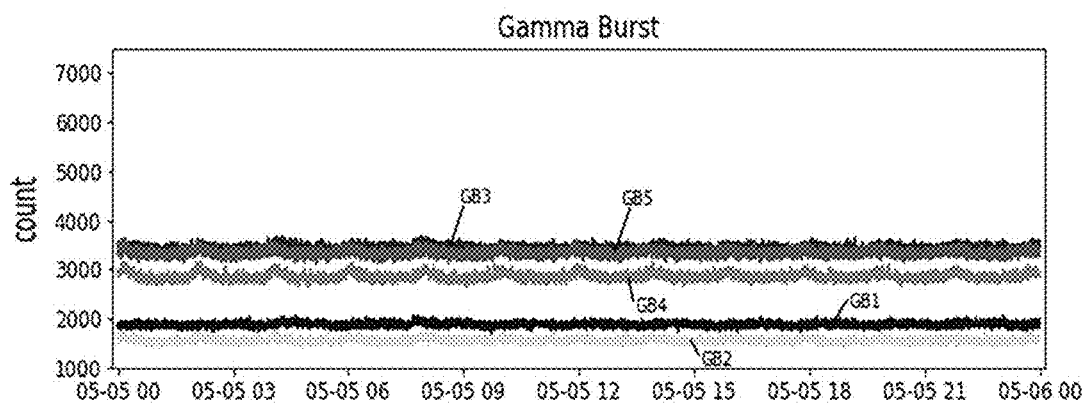

FIG. 7
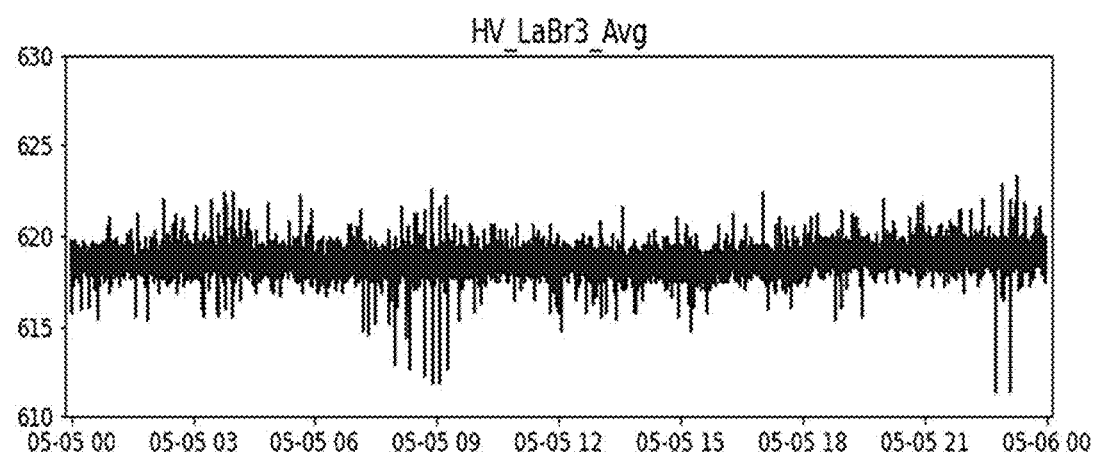
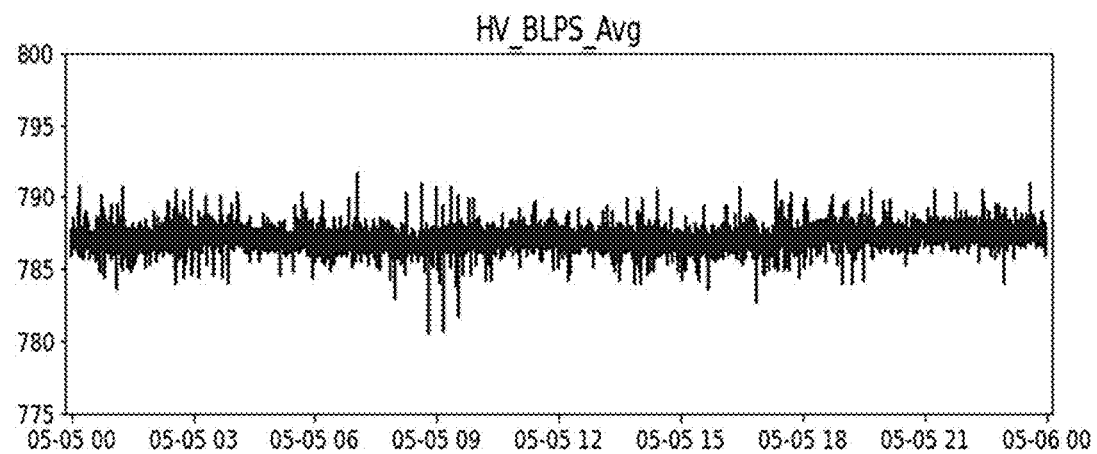

SYSTEM AND METHOD FOR MONITORING GAMMA-RAY SPECTROSCOPY DATA FROM SATELLITES

CROSS-REFERENCE TO RELATED APPLICATION

This application claims priority to Korean Patent Application No. 10-2023-0107348 filed on Aug. 17, 2023, and all the benefits accruing therefrom under 35 U.S.C. § 119, the contents of which is incorporated by reference in its entirety.

BACKGROUND OF THE DISCLOSURE

Field of the Disclosure

The present disclosure relates to a spectrometer data monitoring system and method, and more particularly, to a system and a method for monitoring gamma-ray spectrometer data from a planetary exploration satellite, designed to collect and analyze data in real-time from a gamma-ray spectrometer of a lunar exploration satellite.

Description of the Related Art

A gamma-ray spectrometer is a device used to measure the energy of gamma rays emitted by unknown isotopes, and it is utilized in fields such as nuclear science, geochemistry, and astrophysics. Particularly, the application of gamma-ray spectroscopy is essential for determining the presence of water during planetary exploration.

Specifically, the gamma-ray spectrometer equipped on lunar exploration satellites (such as Danuri, KPLO) collects data every 10 seconds and continuously stores the data with 100% duty cycle.

Consequently, the number of data entries stored per day amounts to 24*3600/10, which is a substantial amount. Each data file contains various measurement data, making it extremely challenging to manually classify the data collected over specific periods for verification and analysis of each data point as needed.

Therefore, there is a need to develop a system and method that can monitor and verify whether the gamma-ray spectrometer data and other data sent from planetary exploration satellites are normal, and facilitate the analysis of planetary exploration conditions and gamma-ray spectrometer data.

RELATED PATENT DOCUMENT

Patent Document 1: Korean Registered Patent No. 10-1824629 (Jan. 26, 2018)
Patent Document 2: Korean Patent Publication No. 10-2017-0014622 (Feb. 8, 2017)

SUMMARY OF THE DISCLOSURE

The purpose of the present disclosure, which aims to solve the aforementioned conventional problems, is to provide a system and a method for monitoring gamma-ray spectrometer data from a planetary exploration satellite. This system and method enable intuitive, one-glance verification of whether any unusual signals have been detected from the data collected by the planetary exploration satellite, while also ensuring the availability of data that is easy to analyze.

In order to achieve the purpose, an aspect of the present disclosure provides a system for monitoring gamma-ray spectrometer data from a satellite, the system comprising: a data collection unit configured to collect a raw data including a gamma-ray data from a planetary exploration satellite having a gamma-ray spectrometer; an environment setting unit configured to set and input a time range for monitoring and a display environment; a data processing unit configurd to store a filing data in which the raw data collected based on the inputted time range is classified and processed by time and by item; and a visualization unit configured to visualize the stored filing data as a graphic data.

In some exemplary embodiments, the data collection unit may include: a reception unit configured to receive the raw data and an exploration environment information at a predetermined time interval; and a data storage unit configured to store the raw data and the exploration environment information that are received.

In some exemplary embodiments, the exploration environment information may include at least one of an information about the gamma-ray spectrometer, an information about the planetary exploration satellite, or an information about gamma-ray, or a combination thereof.

In some exemplary embodiments, the environment setting unit may be configured to set the time range by setting a start and an end by selecting units of year, month, day, hour, minute, and second.

In some exemplary embodiments, the data processing unit may include: a summing unit configured to sum data collected from at least one channel within the time range and to classify the summed data by time and by item, when the raw data is spectrum data; and a file storage unit configured to store the filing data in which the classified data is identified by a file name and a message information including an information about the time range.

In some exemplary embodiments, the visualization unit may include: a spectrum display unit configured to display a spectrum data collected from a plurality of channels as a graph; and an exploration environment display unit configured to display an exploration environment information including an information about the gamma-ray spectrometer, an information about the planetary exploration satellite, and an information about gamma-ray as a graph.

In some exemplary embodiments, the spectrum display unit may be configured to display a result of summing the spectrum data collected from the plurality of channels within a set period of time as a plurality of graphs, wherein the spectrum data may include a main spectrometer spectrum data of which background is deducted and a shielding spectrometer spectrum data of which background is deducted.

In some exemplary embodiments, the information about the gamma-ray spectrometer may include: a high voltage average value of each of a main spectrometer and a shielding spectrometer of the gamma-ray spectrometer; and an internal temperature value of the gamma-ray spectrometer.

In some exemplary embodiments, the information about the planetary exploration satellite may include a position information of the planetary exploration satellite relative to a center of a planet to be explored.

In some exemplary embodiments, the information about gamma-ray may includes a gamma-ray burst data and a gamma-ray total count information.

Further, in order to achieve the purpose, another aspect of the present disclosure provides a method for monitoring gamma-ray spectrometer data from a satellite, the method comprising steps of: (a) collecting, by a data collection unit, a raw data including gamma-ray data periodically from the planetary exploration satellite; (b) inputting a time range for monitoring into an environment setting unit; (c) storing, by a data processing unit, a plurality of filing data in which the raw data collected based on the inputted time range is classified and processed by time and by item; and (d) visualizing, by a visualization unit, at least some selected from the stored plurality of filing data as a graphic data.

In some exemplary embodiments, the step (a) may include storing the collected raw data and an exploration environment information at a predetermined time interval.

In some exemplary embodiments, the step (c) may include steps of: (c1) summing, by a summing unit, spectrum data among the raw data collected from at least one channel within the time range to classify the summed spectrum data by time and by item; and (c2) storing, by a file storage unit, the filing data in which the classified spectrum data is identified by a file name and a message information including an information about the time range.

Further, in order to achieve the purpose, still another aspect of the present disclosure provides a computer program stored in a medium for executing the method for monitoring gamma-ray spectrometer data from a exploration satellite on a computer.

Specific details of other exemplary embodiments are included in "Details for carrying out the invention" and accompanying "drawings".

Advantages and/or features of the present disclosure, and a method for achieving the advantages and/or features will become obvious with reference to various exemplary embodiments to be described below in detail together with the accompanying drawings.

However, the present disclosure is not limited only to a configuration of each exemplary embodiment disclosed below, but may also be implemented in various different forms. The respective exemplary embodiments disclosed in this specification are provided only to complete disclosure of the present disclosure and to fully provide those skilled in the art to which the present disclosure pertains with the category of the present disclosure, and the present disclosure will be defined only by the scope of each claim of the claims.

The present disclosure provides a system and method for monitoring gamma-ray spectrometer data from a planetary exploration satellites that can perform a data extraction function by displaying data by time period from all data collected to extract data for a specific time period, thereby enabling a data extraction function to be performed to identify data problems that occurred during a specific time period or to extract data for a time period of research interest so that the time period can be specifically analyzed and studied.

The present disclosure also provides a system and method for monitoring gamma-ray spectrometer data from a planetary exploration satellite that allows a user to intuitively check, at a glance, whether each piece of data is in chronological order, whether there are errors in the data, and whether there are any unusual signals, all through graphs displayed on a single screen.

BRIEF DESCRIPTION OF THE DRAWINGS

Figure 3:
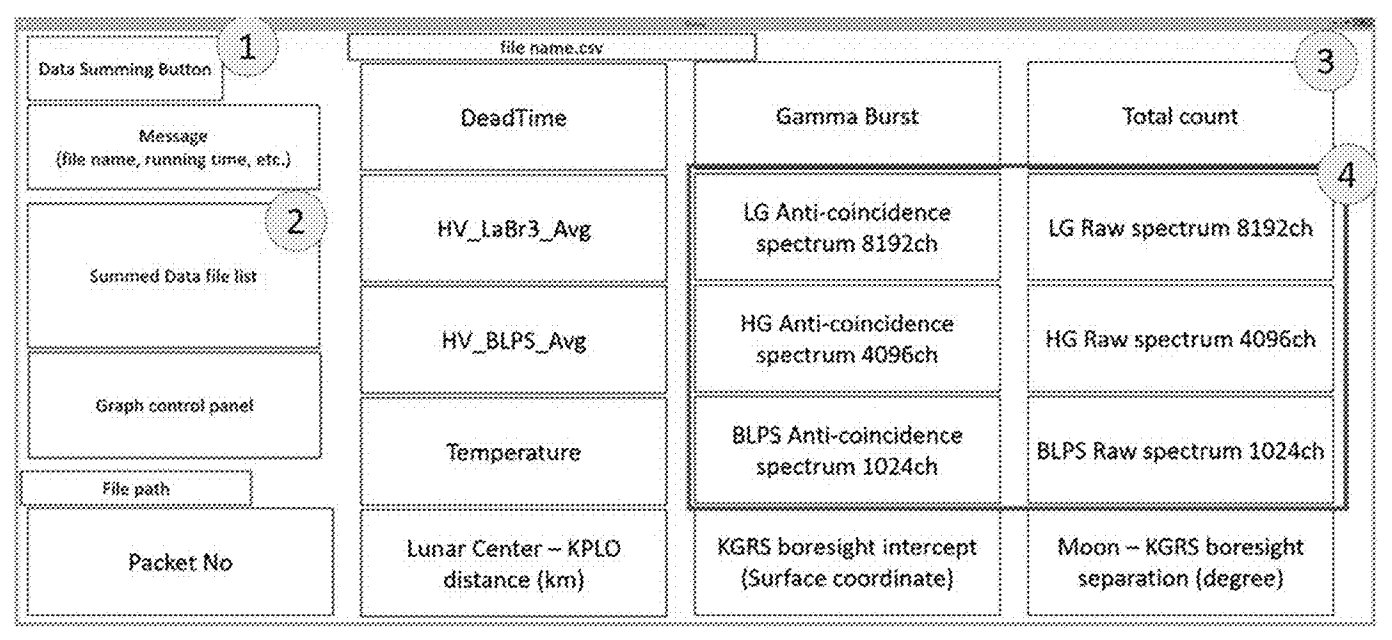

FIG. 3 is a diagram illustrating the UI blocks of a monitoring screen displayed by applying the system and method for monitoring gamma-ray spectrometer data from a lunar exploration satellite according to an exemplary embodiment of the present disclosure.

FIG. 4 through FIG. 13 is a diagram illustrating an actual example of the gamma-ray spectrometer data monitoring screen displayed by applying the system and method for monitoring gamma-ray spectrometer data from a lunar exploration satellite according to an exemplary embodiment of the present disclosure.

DETAILED DESCRIPTION OF THE DISCLOSURE

Figure 1:
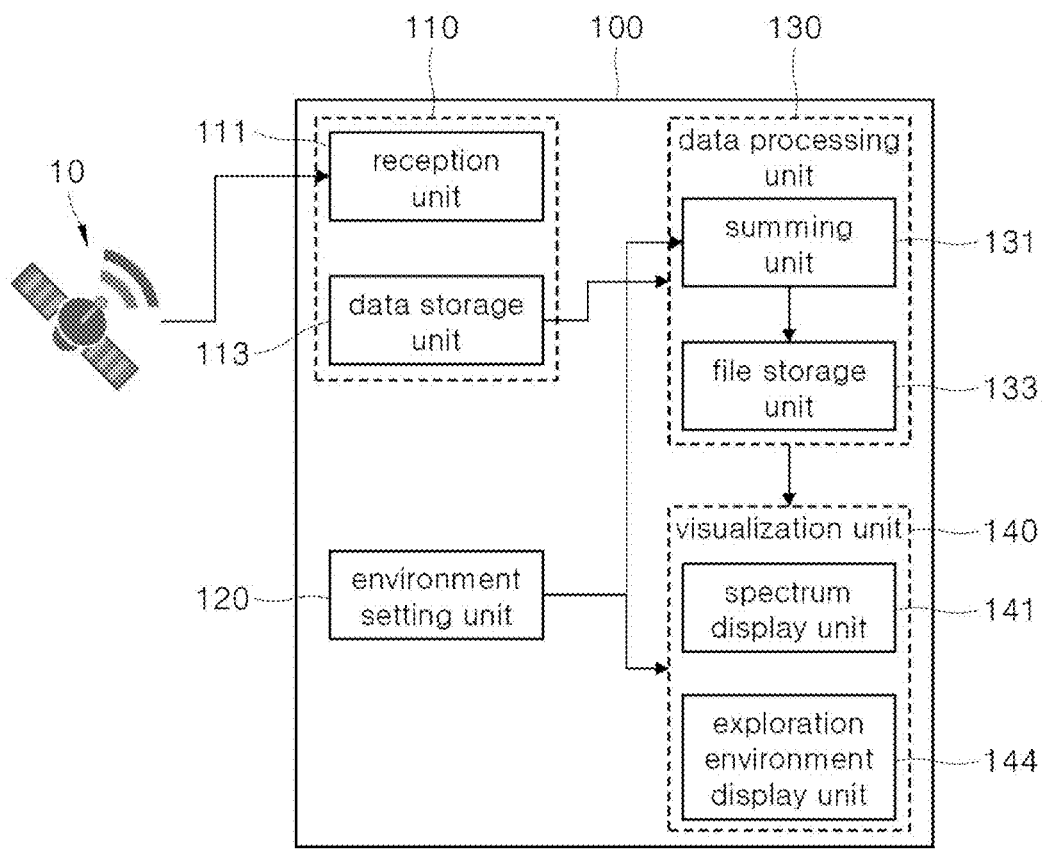
FIG. 1 is a diagram illustrating the block configuration of a system for monitoring gamma-ray spectrometer data from a satellite according to an exemplary embodiment of the present disclosure.

Before describing the present disclosure in detail, the terms or words used in this specification should not be construed as being unconditionally limited to their ordinary or dictionary meanings, and in order for the inventor of the present disclosure to describe his/her disclosure in the best way, concepts of various terms may be appropriately defined and used, and furthermore, the terms or words should be construed as means and concepts which are consistent with a technical idea of the present disclosure.

That is, the terms used in this specification are only used to describe preferred embodiments of the present disclosure, and are not used for the purpose of specifically limiting the contents of the present disclosure, and it should be noted that the terms are defined by considering various possibilities of the present disclosure.

Further, in this specification, it should be understood that, unless the context clearly indicates otherwise, the expression in the singular may include a plurality of expressions, and similarly, even if it is expressed in plural, it should be understood that the meaning of the singular may be included.

In the case where it is stated throughout this specification that a component "includes" another component, it does not exclude any other component, but may further include any other component unless otherwise indicated.

Furthermore, it should be noted that when it is described that a component "exists in or is connected to" another component, this component may be directly connected or installed in contact with another component, and in inspect to a case where both components are installed spaced apart from each other by a predetermined distance, a third component or means for fixing or connecting the corresponding component to the other component may exist, and the description of the third component or means may be omitted.

On the contrary, when it is described that a component is "directly connected to" or "directly accesses" to another component, it should be understood that the third element or means does not exist.

Similarly, it should be construed that other expressions describing the relationship of the components, that is, expressions such as "between" and "directly between" or "adjacent to" and "directly adjacent to" also have the same purpose.

In addition, it should be noted that if terms such as "one side", "other side", "one side", "other side", "first", "second", etc., are used in this specification, the terms are used to clearly distinguish one component from the other component and a meaning of the corresponding component is not limited used by the terms.

Further, in this specification, if terms related to locations such as "upper", "lower", "left", "right", etc., are used, it should be understood that the terms indicate a relative location in the drawing with respect to the corresponding component and unless an absolute location is specified for their locations, these location-related terms should not be construed as referring to the absolute location.

Further, in this specification, in specifying the reference numerals for each component of each drawing, the same component has the same reference number even if the component is indicated in different drawings, that is, the same reference number indicates the same component throughout the specification.

In the drawings attached to this specification, a size, a location, a coupling relationship, etc. of each component constituting the present disclosure may be described while being partially exaggerated, reduced, or omitted for sufficiently clearly delivering the spirit of the present disclosure, and thus the proportion or scale may not be exact.

Further, hereinafter, in describing the present disclosure, a detailed description of a configuration determined that may unnecessarily obscure the subject matter of the present disclosure, for example, a detailed description of a known technology including the prior art may be omitted.

Hereinafter, exemplary embodiments of the present disclosure will be described in detail with reference to related drawings.

FIG. 1 is a diagram illustrating the block configuration of a system 100 for monitoring gamma-ray spectrometer data from a satellite according to an exemplary embodiment of the present disclosure.

As shown in FIG. 1, the system 100 for monitoring gamma-ray spectrometer data according to an embodiment of the present disclosure may include a data collection unit 110, an environment setting unit 120, a data processing unit 130, and a visualization unit 140.

Here, the data collection unit 110 may be configured to collect the following data from the satellite 10 having a gamma-ray spectrometer: a raw data including a gamma-ray data; and an exploration environment information including an information about the gamma-ray spectrometer, an information about the satellite 10, or an information about gamma-ray.

The gamma-ray spectrometer (GRS) on a lunar orbiter can be designed to collect data on the composition of the moon. This spectrometer is a device that measures the energy of gamma rays emitted by the interaction of radioactive isotopes with cosmic rays on the lunar surface.

Since each element emits gamma rays at specific energies, the gamma rays detected by the spectrometer can reveal information about the elements present on the lunar surface, allowing for identification of elements and estimation of their quantities.

The data collected by the gamma-ray spectrometer is typically very complex and requires sophisticated analysis. The raw data usually takes the form of spectra, which graph the number of gamma rays detected at each energy level.

Although gamma-ray spectrometers can only detect elements within the upper few centimeters of the lunar surface, the data they provide can still be very useful for understanding the moon's geology and potential resources.

As shown in FIG. 1, the data collection unit 110 may include a reception unit 111 configured to receive the raw data and the exploration environment information at a predetermined time intervals, and a data storage unit 113 configured to store the received raw data and exploration environment information.

Here, the exploration environment information may include at least one of an information about the gamma-ray spectrometer, an information about the planetary exploration satellite 10, or an information about gamma-ray, or a combination thereof.

Data communication between a planetary exploration satellite 10 and the gamma-ray spectrometer data monitoring system 100 according to an exemplary embodiment of the present disclosure can be carried out via wireless communication using a specific allocated frequency between the satellite 10 and a ground station, and data can be communicated between the ground station and the reception unit 111 of the gamma-ray spectrometer data monitoring system 100 according to an exemplary embodiment of the present disclosure via wired or wireless communication.

That is, the data collected by the planetary exploration satellite 10 may be transmitted to the ground station through the communication system within the satellite 10, and the ground station may receive the data and may transmit it to the monitoring system 100 according to an exemplary embodiment of the present disclosure.

In addition, the communication time between the planetary exploration satellite 10 and the Earth is determined by the distance and communication speed, and data transmission and reception can only occur during time periods when communication with Earth is possible. The reception unit 111 can receive the aforementioned raw data and exploration environment information at a predetermined time interval or period.

Moreover, the data storage unit 113 may be a device that stores the received raw data and exploration environment information, serving as a repository for unprocessed raw data.

In addition, as shown in FIG. 1, the environment setting unit 120 may be configured to set and input the time range for monitoring and the display environment. That is, the environment setting unit 120 allows for setting the start and end times in time units such as year, month, day, hour, minute, and second for the time range to be monitored, and provides a configuration to customize the monitoring environment according to the user's requirements by setting various display conditions when the graphic data is displayed in the visualization unit 140.

The data processing unit 130 may be configured to store filing data classified and processed by time and by item based on the raw data collected according to the time range input. The data processing unit 130 may include a summing unit 131 configured to sum the collected data and to classify the data by time and item, and a file storage unit 133 configured to store the filing data.

Here, the summing unit 131 may be configured to sum data collected from at least one channel within the time range and to classify the summed data by time and by item, when the raw data is spectrum data.

The summing process refers to gathering and summing the necessary information from the raw data, where the raw data obtained from the gamma-ray spectrometer records multiple item values at each time unit.

The summing process is to generate new data by processing this raw data to extract only the required information and by adding the data corresponding to the time range.

The reasons and advantages of summing the gamma-ray spectrometer data from each channel are as follows:

1) Data Compression: Gamma-ray spectrometers measure and collect data at a very fast rate. When the data measured hourly for multiple items accumulate, the volume of data can become very large. Thus, summing the data corresponding to the time range into one may reduce the data volume significantly compared to the raw data.

2) Information Extraction: Raw data may contain various data items in addition to the information of interest. Summing allows for extracting and storing only the necessary information, making it easier to handle data needed for analysis or visualization.

3) Ease of Data Analysis: Summed data is more refined, making data analysis easier, faster, and more efficient due to the reduced size and focus on necessary information.

4) Real-time Monitoring and Visualization: Because summed data is generated at short intervals, the summed data is useful for real-time monitoring and visualization. It allows for quick acquisition of information needed to observe and respond to gamma-ray activity in real time.

5) Ease of Data Management: Summed data is organized into single files for each time range, making data management more convenient. In addition, since one file is stored per time period, search and backup may be facilitated, and data consistency and accuracy can be ensured.

Therefore, summing is an essential process for efficiently managing raw data, extracting necessary information, and utilizing it for analysis and visualization.

In addition, as shown in FIG. 1, the file storage unit 133 may be configured to store the filing data in which the classified data is identified by a file name and a message information including an information about the time range.

Here, the stored files may have a data structure in table format, and may use files in the table-format data structure, such as CSV or spreadsheet files, where each data item is represented with commas or other delimiters.

The visualization unit 140 may be configured to visualize the stored filing data as a graphic data.

The visualization unit 140 may include a spectrum display unit 141 configured to display a spectrum data collected from a plurality of channels as a graph, and an exploration environment display unit 144 configured to display an exploration environment information as a graph.

The exploration environment information may include an information about the gamma-ray spectrometer, an information about the planetary exploration satellite, and an information about gamma-ray.

In this way, by displaying the gamma-ray spectrometer data of the satellite 10 as graphical data that can be intuitively checked at a glance by multiple channels, it is possible to efficiently monitor the geological and resource information of planets such as the moon, and it has a great advantage that it can be immediately used as a material for effective analysis.

Here, the spectrum display unit 141 may be configured to display a result of summing the spectrum data collected from the plurality of channels within a set period of time as a plurality of graphs, wherein the spectrum data mqy include a main spectrometer spectrum data of which background is deducted and a shielding spectrometer spectrum data of which background is deducted.

That is, the spectrum display unit 141 may be configured to visualize the spectrum data within the set period input through the environment setting unit 120 by processing the following data into graphic data: 1) main spectrometer spectrum data of which background is deducted, 2) shielding spectrometer spectrum data of which background is deducted, 3) main spectrometer spectrum data before background deduction, and 4) shielding spectrometer spectrum data before background deduction.

Here, the spectrum data of the main spectrometer may include a signal processing data at high gain and a signal processing data at low gain.

As shown in FIG. 1, among the exploration environment information that the exploration environment display unit 144 displays as a graph, the information about the gamma-ray spectrometer may include: a high voltage average value of each of a main spectrometer and a shielding spectrometer of the gamma-ray spectrometer; and an internal temperature value of the gamma-ray spectrometer.

In addition, the information about the planetary exploration satellite 10 may include a position information of the planetary exploration satellite 10 relative to a center of a planet (moon) to be explored. The information about gamma-ray may include a gamma-ray burst data and a gamma-ray total count information.

Figure 2:
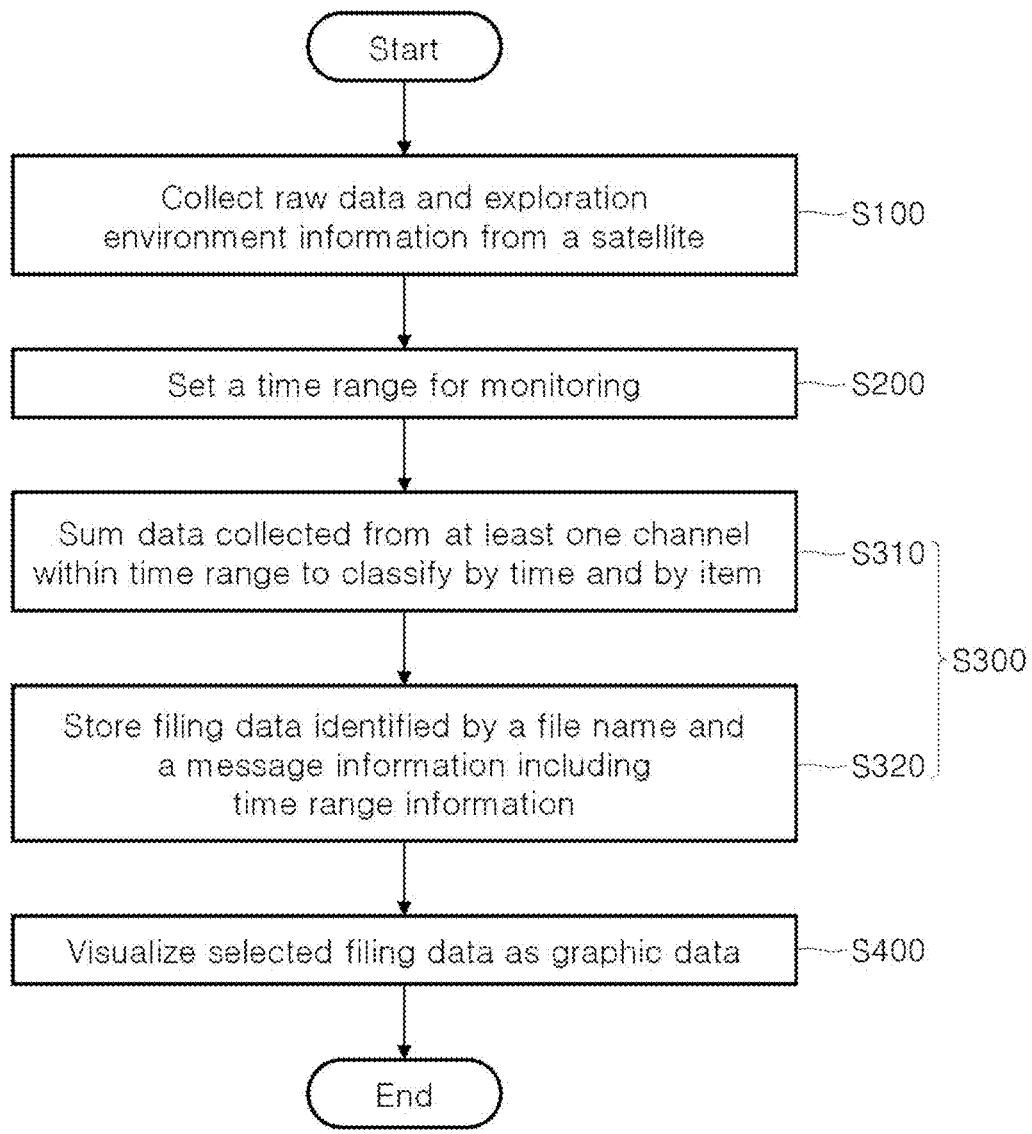
FIG. 2 is a diagram illustrating the detailed flow of a method for monitoring gamma-ray spectrometer data from an exploration satellite according to an exemplary embodiment of the present disclosure.
Figure 5:
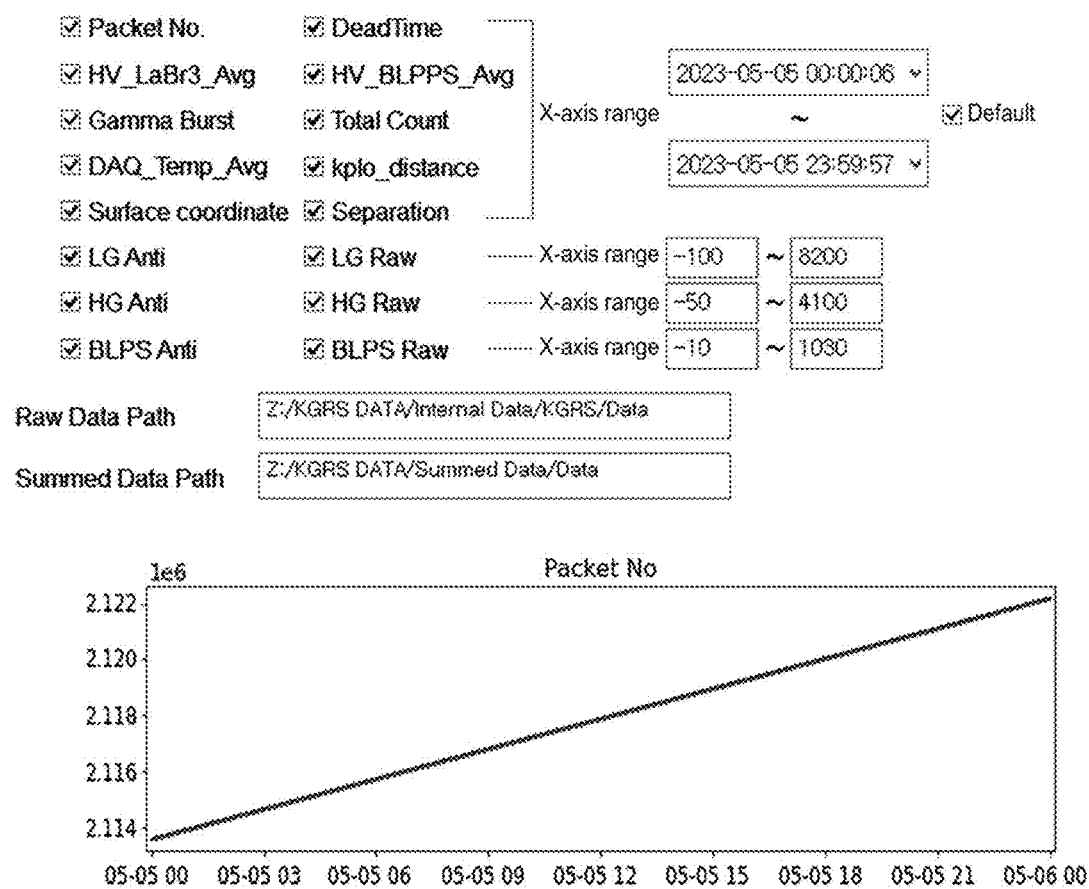
Figure 8:
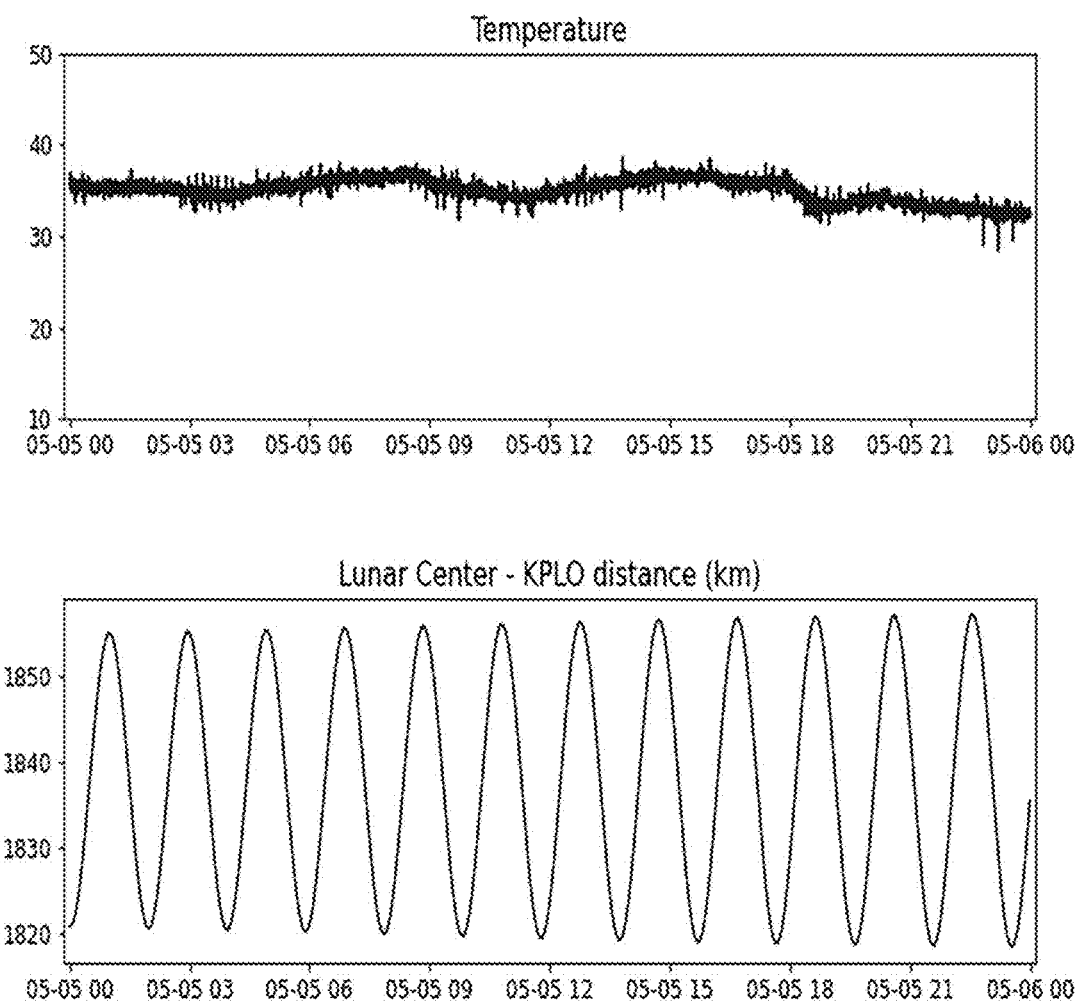
Figure 9:
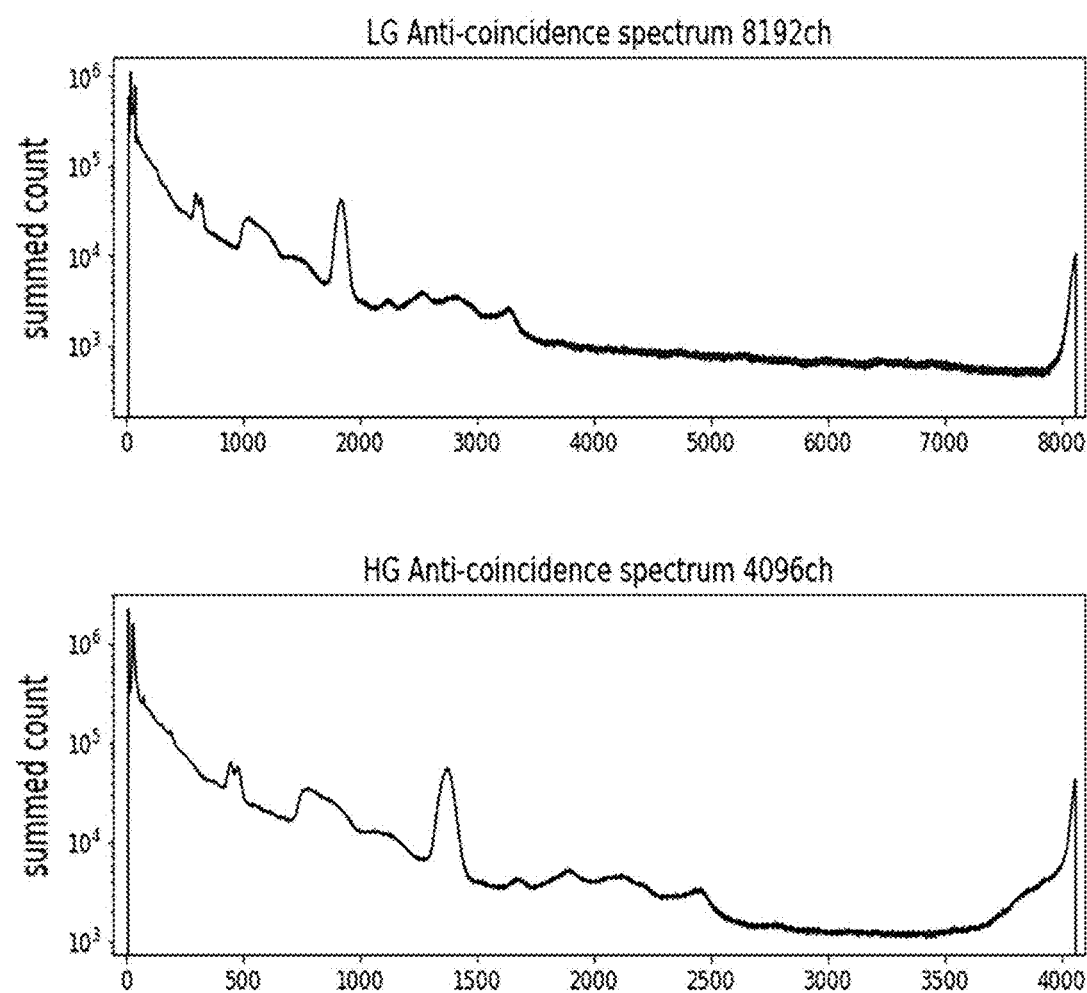
Figure 10:
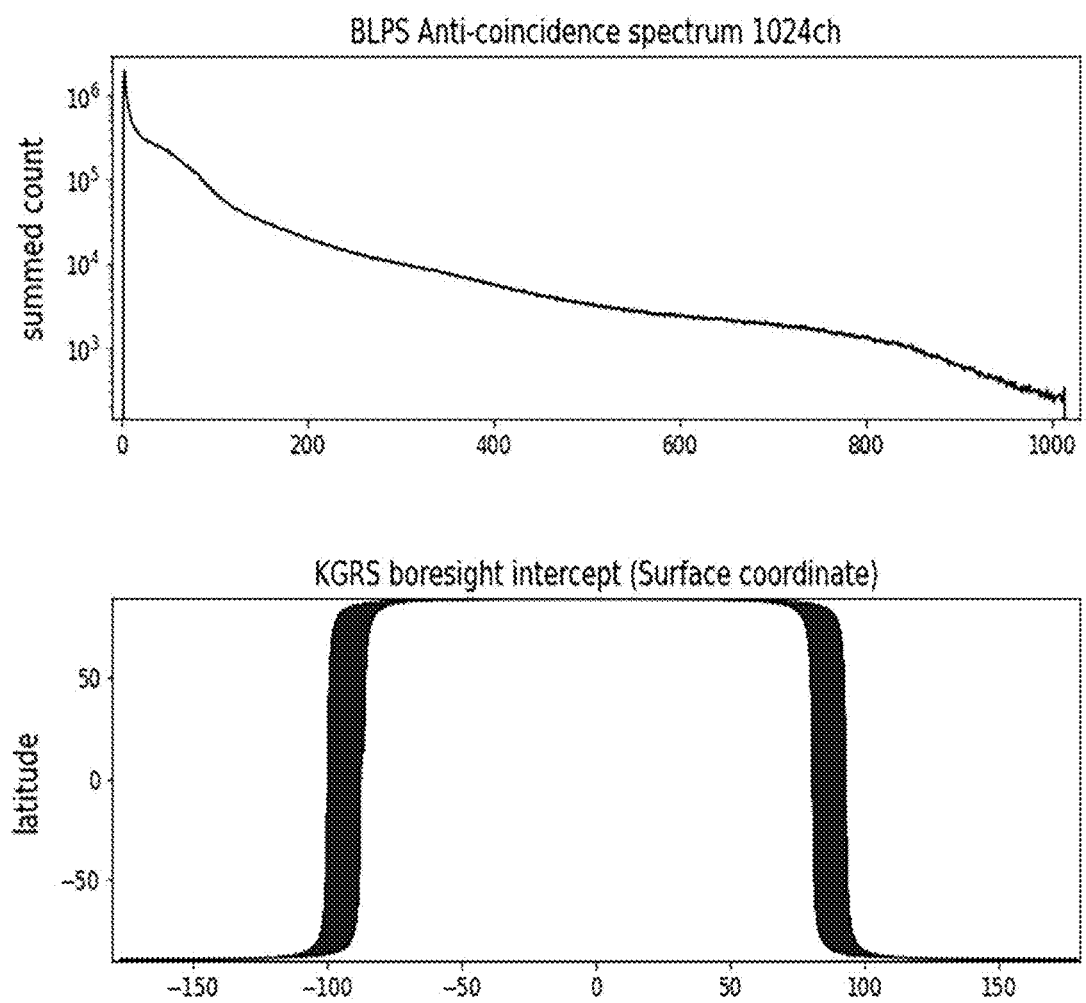
Figure 11:
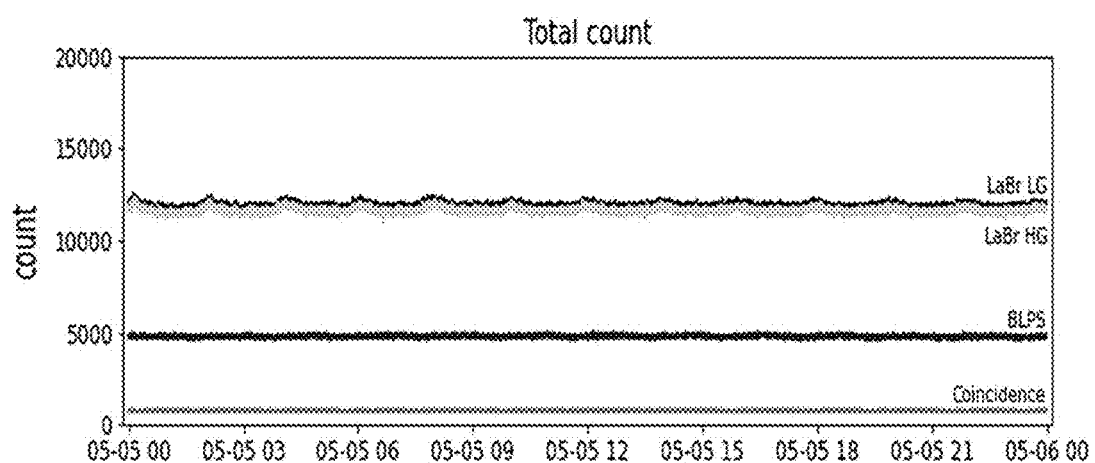
Figure 12:
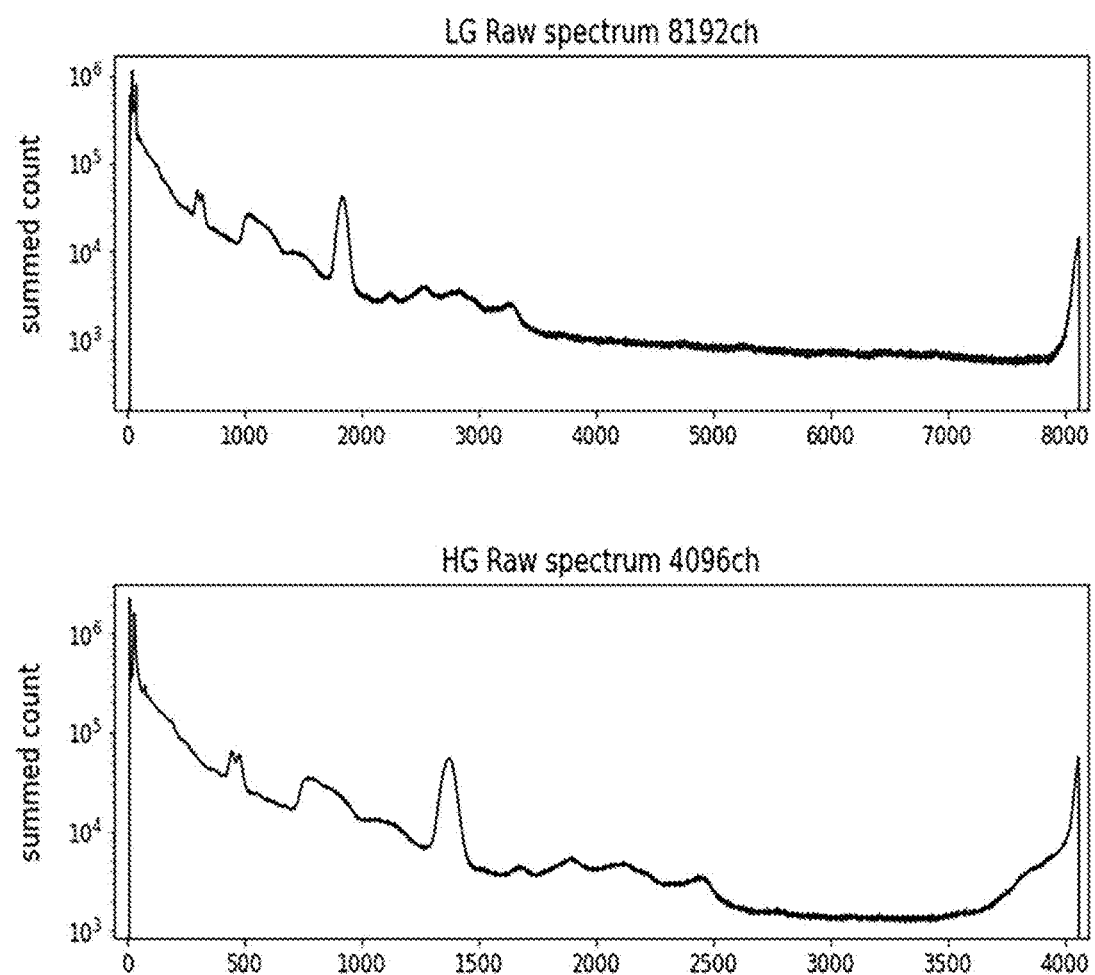
Figure 13:
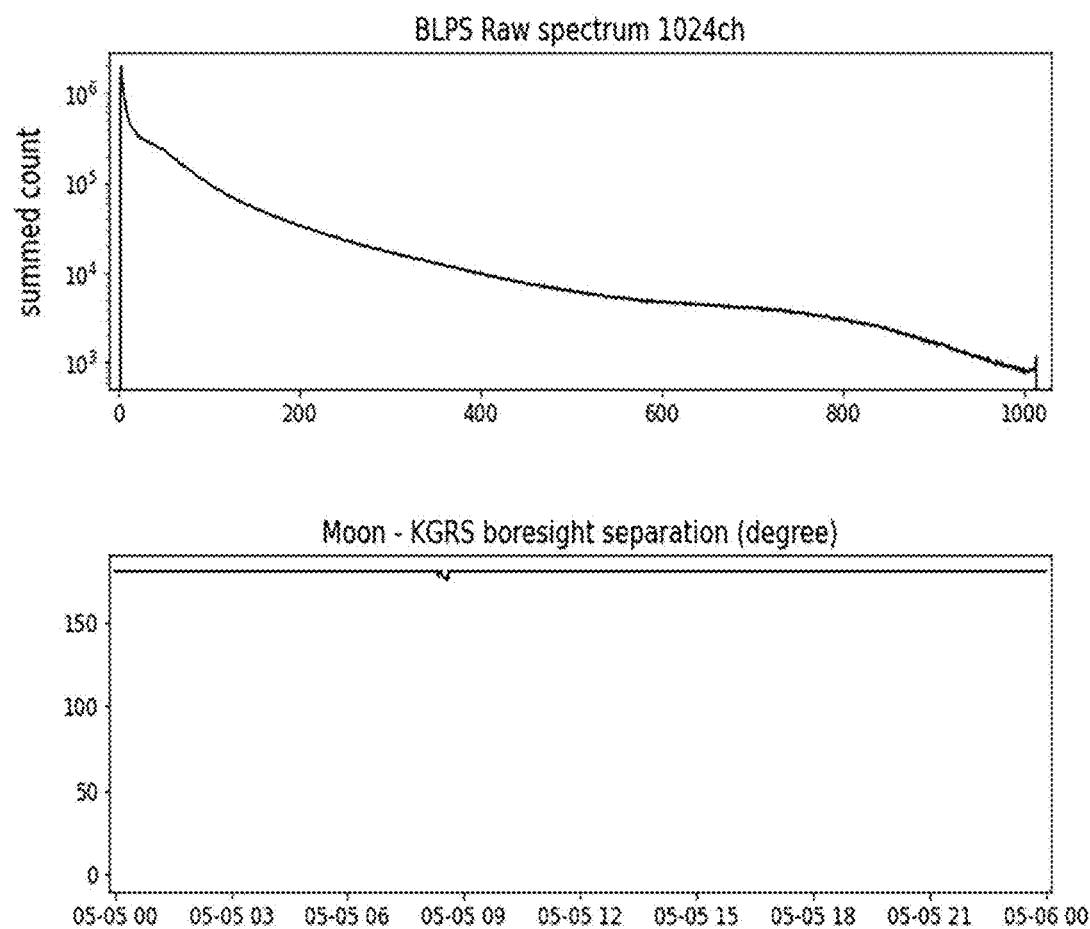

FIG. 2 is a diagram illustrating the detailed flow of a method for monitoring gamma-ray spectrometer data from an exploration satellite 10 according to an exemplary embodiment of the present disclosure.

As shown in FIG. 2, the method for monitoring gamma-ray spectrometer data from an exploration satellite 10 according to an exemplary embodiment of the present disclosure may comprise steps of: (a) (S100) collecting, by a data collection unit 110, a raw data including gamma-ray data periodically from the planetary exploration satellite; (b) (S200) inputting a time range for monitoring into an environment setting unit 120; (c) (S300) storing, by a data processing unit 130, a plurality of filing data in which the raw data collected based on the inputted time range is classified and processed by time and by item; and (d) (S400) visualizing, by a visualization unit 140, at least some selected from the stored plurality of filing data as a graphic data.

Here, the step (a) (S300) may include storing the collected raw data and an exploration environment information at a predetermined time interval.

In addition, the step (c) may includes steps of: (c1) (S310) summing, by a summing unit 131, spectrum data among the raw data collected from at least one channel within the time range to classify the summed spectrum data by time and by item; and (c2) (S320) storing, by a file storage unit 133, the filing data in which the classified spectrum data is identified by a file name and a message information including an information about the time range.

Hereinafter, an exemplary embodiment is described in detail, with reference to the drawings, where the system 100 and method for monitoring gamma-ray spectrometer data from a exploration satellite 10 according to an exemplary embodiment of the present disclosure is applied to the system 100 and method for monitoring gamma-ray spectrometer data from a lunar exploration satellite 10.

FIG. 3 is a diagram illustrating the UI blocks of a monitoring screen displayed by applying the system 100 and method for monitoring gamma-ray spectrometer data from a lunar exploration satellite 10 according to an exemplary embodiment of the present disclosure. FIG. 4 through FIG. 13 is a diagram illustrating an actual example of the gamma-ray spectrometer data monitoring screen displayed by applying the system 100 and method for monitoring gamma-ray spectrometer data from a lunar exploration satellite 10 according to an exemplary embodiment of the present disclosure.

The gamma-ray spectrometer described in the following may be a payload of a lunar exploration satellite 10 that measures gamma rays emitted from the lunar surface. The data measured by the gamma-ray spectrometer can be used to distinguish lunar surface elements by using the unique energy levels (keV) of gamma rays emitted by each radioactive element on the lunar surface. The gamma-ray spectrometer can also be utilized to create maps of the lunar cosmic radiation environment.

For example, the gamma-ray spectrometer of Danuri, which is also know as KPLO (The Korea Pathfinder Lunar Orbiter), can collect gamma-ray observation data from the moon every 10 seconds continuously for 24 hours a day on lunar orbit.

As shown in FIG. 3, the data summing function for the data collected from the lunar exploration satellite 10 can be executed by inputting a command through area ① of the monitoring UI image output by the visualization unit 140. This can be performed by the environment setting unit 120 of the gamma-ray data monitoring system 100 from the exploration satellite 10 according to an exemplary embodiment of the present disclosure.

That is, by inputting the desired time range in this area, the necessary information from the raw data and PP Data (Pre-Processed Data) stored in a pre-designated path in the data storage unit 113 can be gathered and compiled into a single document.

Table 1 in the following shows the list of information included in the summed data applied to the system 100 and method for monitoring gamma-ray spectrometer data from a lunar exploration satellite 10 according to an exemplary embodiment of the present disclosure.

TABLE 1

List of Information included in Summed Data

| Number | List of Information |
|---|---|
| 1 | LG Anti-Coincidence spectrum 8192ch |
| 2 | LG Raw spectrum 8192ch |
| 3 | HG Anti-Coincidence spectrum 4096ch |
| 4 | HG Raw spectrum 4096ch |
| 5 | BLPS Anti-Coincidence spectrum 1024ch |
| 6 | BLPS Raw spectrum 1024ch |
| 7 | Gamma Burst |
| 8 | Total count |
| 9 | Packet No |
| 10 | DeadTime |
| 11 | HV_LaBr3_Avg |
| 12 | BLPS_LaBr3_Avg |
| 13 | Temperature |
| 14 | Lunar Center - KPLO Distance (km) |
| 15 | KGRS boresight intercept (lunar coordinate) |
| 16 | Moon - KGRS boresight separation (degree) |

The time range input through area ① includes both the start time and the end time, and can be entered in units of 'year, month, day, hour, minute, and second.'

In addition, only information of predefined items may be retrieved from the raw data and the PP Data. As shown in Table 1, items 1 to 13 may be taken from the raw data, and items 14 to 16 may be taken from the PP Data.

In addition, as shown in Table 1, the spectrum data for items 1 to 6 may contain values for each channel, separated by ';'.

All data values within the entered time range are stored in a summed form. Therefore, the completed summed data may contain one spectrum per item.

Items other than 1 to 6 may have one value per item, stored in the completed summed data without any further modifications in chronological order. The summing unit 131 of the data processing unit 130 may complete the creation of the summed data, which is then stored as filing data in a CSV file or similar format by the file storage unit 133.

Here, the name of the file created and the required time of the generated file may appear in the message box.

As shown in FIG. 3, the list of completed summed data can be viewed in area ②, and clicking a desired file from this list may display its contents as a graph in the right area (③ and ④). In area ④, six spectrum data graphs may be displayed, while the remaining items may be shown as graphs in area ③.

As shown in FIG. 4 through FIG. 13, the six spectrum data graphs in area ④ may include:
1) Background-deducted main spectrometer spectrum data processed at low gain,
2) Background-deducted main spectrometer spectrum data processed at high gain,
3) Background-deducted shielding spectrometer spectrum data,
4) Main spectrometer spectrum data before background deduction processed at low gain,
5) Main spectrometer spectrum data before background deduction processed at high gain, and
6) Shielding spectrometer spectrum data before background deduction.

In addition, as shown in FIG. 4 through FIG. 13, in area ③, graph data of the high voltage average values of the main spectrometer and the shielding spectrometer, and the internal temperature value of the gamma-ray spectrometer may be displayed, as the gamma-ray spectrometer information.

In addition, the information about the satellite 10 may include a distance information from the center of the moon (to be explored) to the satellite 10 (Lunar Center-KPLO distance), a daily orbital segment information (KGRS boresight intercept), and an angular segment information (Moon-KGRS boresight separation), which may be displayed as graphs. As the cosmic gamma-ray information, the information about gamma-ray may include a gamma-ray burst data and a gamma-ray total count information, which may be displayed as graphs.

Here, the boresight intercept refers to the angle between the satellite's line of sight and the position of the target (moon), with the smaller boresight intercept indicating the more accurate target search available by the satellite 10.

The boresight intercept is influenced by the sensor performance, satellite position, and target position. A higher sensor performance of the the satellite 10, a closer position of the satellite 10 to the target, and a closer target position to the line of sight of the satellite 10 result in a smaller boresight intercept.

The boresight separation refers to the angle between two objects facing each other, with a smaller angle indicating closer alignment.

The boresight separation is influenced by various factors such as the size, distance, and speed of the two objects. That is, a larger size, shorter distance, and higher speed lead to a smaller boresight separation.

These displayed graphs allow users to intuitively verify at a glance whether the data is well-ordered chronologically, check for any errors, and detect any special signals.

In addition, each graph's X-axis range can be adjusted via the graph control panel shown in FIG. 3 to focus on a desired time range or a spectrum of a specific channel of interest. This function may be performed by the environment setting unit 120 as shown in FIG. 1.

The program applied to the system 100 and method for monitoring gamma-ray spectrometer data from a satellite 10 according to an exemplary embodiment of the present disclosure may generate one summed data file per day for monitoring the data from the KPLO Gamma-Ray Spectrometer (KGRS). The program may also compile and verify data over shorter or longer periods for various research purposes, offering versatility in data analysis.

The program applied to the system 100 and method for monitoring gamma-ray spectrometer data from a satellite 10 according to an exemplary embodiment of the present disclosure may be implemented as computer-readable code on a computer-readable recording medium. The codes and code segments for implementing the program can be easily inferred by computer programmers skilled in the art.

The computer readable medium includes all kinds of recording devices storing data which may be deciphered by a computer system. Examples of the computer readable recording medium may include a Hard Disk Drive (HDD), a Solid State Disk (SSD), a Silicon Disk Drive (SDD), a ROM, a RAM, a CD-ROM, a magnetic tape, a floppy disk, an optical data storage device, and the like and may further include a device implemented as a type of a carrier wave (e.g., transmission through the Internet). Further, the computer readable medium may be distributed across a networked computer system, written and executed as computer-readable code in a distributed manner.

In the above, although several preferred embodiments of the present disclosure have been described with some examples, the descriptions of various exemplary embodiments described in the "Specific Content for Carrying Out the Invention" item are merely exemplary, and it will be appreciated by those skilled in the art that the present disclosure can be variously modified and carried out or equivalent executions to the present disclosure can be performed from the above description.

In addition, since the present disclosure can be implemented in various other forms, the present disclosure is not limited by the above description, and the above description is for the purpose of completing the disclosure of the present disclosure, and the above description is just provided to completely inform those skilled in the art of the scope of the present disclosure, and it should be known that the present disclosure is only defined by each of the claims.

LIST OF REFERENCE NUMBERS

10: planetary exploration satellite
100: system for monitoring gamma-ray spectrometer data from a satellite
110: data collection unit
111: reception unit
113: data storage unit
120: environment setting unit
130: data processing unit
131: summing unit
133: file storage unit
140: visualization unit
141: spectrum display unit
144: exploration environment display unit

What is claimed is:

1. A system for monitoring gamma-ray spectrometer data from a satellite, the system comprising:
   a data collection unit configured to collect a raw data including a gamma-ray data from a planetary exploration satellite having a gamma-ray spectrometer;
   an environment setting unit configured to set and input a time range for monitoring and a display environment;
   a data processing unit configured to store a filing data in which the raw data collected based on the inputted time range is classified and processed by time and by item; and
   a visualization unit configured to visualize the stored filing data as a graphic data,
   wherein the data processing unit includes:
   a summing unit configured to sum data collected from at least one channel within the time range and to classify the summed data by time and by item, when the raw data is spectrum data; and
   a file storage unit configured to store the filing date in which the classified data is identified by a file name and a message information including an information about the time range.

2. The system of claim 1, wherein the data collection unit includes:
   a reception unit configured to receive the raw data and an exploration environment information at a predetermined time interval; and
   a data storage unit configured to store the raw data and the exploration environment information that are received.

3. The system of claim 2, wherein the exploration environment information includes at least one of an information about the gamma-ray spectrometer, an information about the planetary exploration satellite, or an information about gamma-ray, or a combination thereof.

4. The system of claim 1, wherein the environment setting unit is configured to set the time range by setting a start and an end by selecting units of year, month, day, hour, minute, and second.

5. The system of claim 1, wherein the visualization unit includes:
   a spectrum display unit configured to display a spectrum data collected from a plurality of channels as a graph; and
   an exploration environment display unit configured to display an exploration environment information including an information about the gamma-ray spectrometer, an information about the planetary exploration satellite, and an information about gamma-ray as a graph.

6. The system of claim 5, wherein the spectrum display unit is configured to display a result of summing the spectrum data collected from the plurality of channels within a set period of time as a plurality of graphs,
   wherein the spectrum data includes a main spectrometer spectrum data of which background is deducted and a shielding spectrometer spectrum data of which background is deducted.

7. The system of claim 5, wherein the information about the gamma-ray spectrometer includes:
   a high voltage average value of each of a main spectrometer and a shielding spectrometer of the gamma-ray spectrometer; and
   an internal temperature value of the gamma-ray spectrometer.

8. The system of claim 5, wherein the information about the planetary exploration satellite includes a position information of the planetary exploration satellite relative to a center of a planet to be explored.

9. The system of claim 5, wherein the information about gamma-ray includes a gamma-ray burst data and a gamma-ray total count information.

10. A method for monitoring gamma-ray spectrometer data from a satellite, the method comprising steps of:
    (a) collecting, by a data collection unit, a raw data including gamma-ray data periodically from the planetary exploration satellite;
    (b) inputting a time range for monitoring into an environment setting unit;

(c) storing, by a data processing unit, a plurality of filing data in which the raw data collected based on the inputted time range is classified and processed by time and by item; and (d) visualizing, by a visualization unit, at least some selected from the stored plurality of filing data as a graphic data, wherein the step (c) includes steps of:

(c1) summing, by a summing unit, spectrum data among the raw data collected from at least one channel within the time range to classify the summed spectrum data by time and by item; and (2) storing, by a file storage unit the filing data in which the classified spectrum data is identified by a file name and a message information including an information about the time range.

11. The method of claim 10, wherein the step (a) includes storing the collected raw data and an exploration environment information at a predetermined time interval.

12. A computer program stored in a medium for executing the method of claim 10 on a computer.

* * * * *